(12) United States Patent
Grolla

(10) Patent No.: US 10,899,066 B2
(45) Date of Patent: Jan. 26, 2021

(54) THERMOFORMING MACHINE

(71) Applicant: Gabler Thermoform GmbH & Co. KG, Lübeck (DE)

(72) Inventor: Peter Grolla, Lübeck (DE)

(73) Assignee: Gabler Thermoform GmbH & Co. KG, Lübeck (DE)

(*) Notice: Subject to any disclaimer, the term of this patent is extended or adjusted under 35 U.S.C. 154(b) by 0 days.

(21) Appl. No.: 16/207,705

(22) Filed: Dec. 3, 2018

(65) Prior Publication Data

US 2019/0168440 A1 Jun. 6, 2019

(30) Foreign Application Priority Data

Dec. 4, 2017 (EP) .................................... 17205164

(51) Int. Cl.

| | | |
|---|---|---|
| *B29C 51/44* | (2006.01) | |
| *B29C 51/26* | (2006.01) | |
| *B26D 7/18* | (2006.01) | |
| *B26D 7/32* | (2006.01) | |
| *B26D 7/06* | (2006.01) | |
| *B26F 1/14* | (2006.01) | |
| *B29C 51/18* | (2006.01) | |
| *B29L 31/00* | (2006.01) | |
| *B29C 51/22* | (2006.01) | |
| *B29K 101/12* | (2006.01) | |

(52) U.S. Cl.
CPC .............. *B29C 51/266* (2013.01); *B26D 7/06* (2013.01); *B26D 7/1863* (2013.01); *B26D 7/32* (2013.01); *B26F 1/14* (2013.01); *B29C 51/18* (2013.01); *B29C 51/44* (2013.01); *B29C 51/22* (2013.01); *B29C 51/261* (2013.01); *B29C 2793/009* (2013.01); *B29C 2793/0009* (2013.01); *B29C 2793/0018* (2013.01); *B29K 2101/12* (2013.01); *B29L 2031/7132* (2013.01)

(58) Field of Classification Search
CPC ..... B26D 7/1863; B29C 51/44; B29C 51/261; B29C 51/266; B29C 51/22; B29K 2102/12; B29D 7/1863; B29D 7/32; B29F 1/14

See application file for complete search history.

(56) References Cited

U.S. PATENT DOCUMENTS

2011/0108667 A1\* 5/2011 Keller ................... B64C 1/1484
244/119

FOREIGN PATENT DOCUMENTS

| DE | 29518952 U1 | | 1/1996 | |
|---|---|---|---|---|
| DE | 102004050917 A1 | | 4/2006 | |
| DE | 102004059962 | \* | 6/2006 | ........... B29C 51/165 |
| DE | 102015222455 A1 | | 5/2017 | |
| EP | 2251181 B1 | | 5/2012 | |

OTHER PUBLICATIONS

Translation of DE102004059962 Jaag (Year: 2006).\*

\* cited by examiner

*Primary Examiner* — Jacob T Minskey
*Assistant Examiner* — Adrien J Bernard
(74) *Attorney, Agent, or Firm* — Smartpat PLC

(57) ABSTRACT

A thermoforming machine for manufacturing articles from a heated thermoplastic film includes a molding station, an extraction device, a hole punch; and a stacking station. The hole punch includes a pivotable lower punching tool which receives punched-out articles from the extraction device while being pivoted into a tilted position facing the extraction device and which pivots into a vertical 0° position to face an upper punching tool for punching operation.

7 Claims, 3 Drawing Sheets

THERMOFORMING MACHINE

TECHNICAL FIELD

The disclosure relates to a thermoforming machine for manufacturing articles from a heated thermoplastic synthetic film.

BACKGROUND

A thermoforming machine, in which a film for molding, punching and stacking of articles arrives, via an intermittent film transport, initially in a molding station, then in a hole punching station and ultimately in a stacking station which is usually formed as a standard stacking and counting device, is disclosed in DE 10 2015 222 455 A1. Unless the molding station includes a combined molding and punching tool, this gives rise to a production line with four consecutive stations, namely the molding of the articles in the molding station, the punching of the holes or openings in the hole punching station, the punching out of the contour in the punching-out station and the stacking of the finished articles in the stacking station. The molding tool can be formed in a single row or with male or female molds arranged in several rows. This is equally true for the hole punch, which may also feature a single-row or multi-row punching tools, in particular punching dies or cutting punches or similar cutting means. A hole punch for plastic films or other flexible films is known, for example, from DE 295 18 952 U1.

For a thermoforming system operated without a hole punching station, such that the stacking station immediately adjoins the molding station, a molding tool is known from DE 10 2004 050 917 A1, the lower tool of which for extracting the molded and punched articles can be pivoted around a horizontal axis in a position tilted in the travel direction of the film. From the tilted position, the articles are gripped by means of suction mandrels or vacuum rods of a linearly movable extraction device pivotable around a horizontal axis and are stacked after pivoting and switching off the negative pressure. The arrangement of such extraction devices movable between the molding station and the stacking station in the form of swivel catching devices or turning plate stackers or similar means taking up articles with suction mandrels and forwarding them after swiveling is also known from EP 2 251 181 B1.

The integration of a hole punch into a production line is required if the manufactured articles, such as trays, plant pots, coffee capsules or the like, must be provided with holes. For this purpose, the articles formed and punched in a thermoforming machine with a tilting tool are extracted by means of vacuum or suction mandrels from the tilted lower tool of the molding station, and are inserted into pallets of a pallet conveyor. The pallets, which are populated with the articles to be punched, are then conveyed into the hole punch by means of chains. After punching, the perforated articles are conveyed to the stacking station or stacking and counting device, where the individual articles are pushed out of the pallets onto a stacking plate, extracted in rods after a preset number of articles has been stacked, and packaged by hand by means of a stacking belt or automatically placed in a box.

Apart from the fact that, due to the conveying by chains and pallets, the positioning of the articles in the hole punch makes it difficult to achieve the required high degree of precision in punching the holes, the change to another format is also highly laborious and time-consuming. This is because, in order to carry out a tool change, the complete chain conveyor with the pallets must be moved backwards, so that the tool can be extracted from the molding station. In addition, numerous pallets (approximately 20) have to be changed. After the change to the format or tool, all components must once again be aligned.

The invention is therefore based on the object of improving the operation of a thermoforming machine conforming to the type; in particular, one that enables a high degree of accuracy of the holes to be punched and at the same time simplifies the format change.

SUMMARY

This object is accomplished by a hole punch which is formed with a lower punching tool that is pivotable around a horizontal axis, and preferably arranged on a pivot table, which, with a position that swings out in the direction of the extraction device, picks up the articles and inserts them in the hole punch by pivoting back into the vertical 0-degree position.

This makes it possible to achieve a backlash-free positioning of the articles in the hole punch that is not affected by any means of conveyance whatsoever. Since the lower punching tool can be tilted or swung, it can remove the articles taken up by the suction mandrels of the extraction device without the interposition of an additional conveyor. This further simplifies the format change considerably, in particular because a complex pallet change is eliminated and a chain conveyor need not be advanced.

A thermoforming machine for manufacturing articles from a heated thermoplastic film thus comprises a molding station with a molding and punching-out molding tool that includes an upper tool and a lower tool. The lower tool is arranged on a tool table adjustable in an opening and a closing direction and can be pivoted on this around a horizontal axis. An extraction device subsequent to the molding station in the travel direction of the film grips the punched-out articles from the tilted lower tool by means of suction mandrels and feeds the articles to a hole punch. The hole punch includes an upper punching tool that can be driven in a raising and lowering manner and possesses punching dies and a lower punching tool which receives the articles. A stacking station is arranged downstream of the hole punch.

A preferred design provides that, with the arrangement of the hole punch in line with the molding station and the stacking station, the lower punching tool can be pivoted both against the travel direction of the film and in the travel direction of the film, preferably by a total of 180°, whereas, between each of the molding station and the hole punch and in the stacking station behind the hole punch, a swivel catching device is provided, of which at least the swivel catching device following the molding station is also linearly movable. The lower punching tool, which can also be pivoted towards the stacking station, also makes it possible to extract the articles made available from a tilted position of approximately 80° and provided with punched holes by means of a turning plate stacker or a swivel catching device, and to then count and stack them. The total passage of the articles through the stations following each other in a production line (that is, from the molding station to the stacking station) thereby takes place exclusively by pivoting movements, supplemented by the linear movability of the swivel catching device to overcome a safety distance to be adhered to for the individual stations or to bridge distances between the individual stations that are necessary for structural reasons.

An alternative design provides that, with an arrangement of the hole punch offset to one side of the line, whereas its upper punching tool and the lower punching tool extend in a manner orthogonal to the molding tool of the molding station, the lower punching tool is pivotable only in the direction of the line, preferably by 90°, and the extraction device arranged between the molding station and the stacking station is formed as an article handling unit featuring plates that are provided, in a manner that is linearly adjustable, on a support frame rotatable around a vertical axis and that are equipped with suction mandrels.

Thereby, the hole punch can be operated without a punching tool that can be swiveled by up to 180°, and instead of a swivel catching device as the extraction device, an article handling unit rotatable around a vertical axis is provided between the molding station and the stacking station. As a result of the vertical rotatability, the plates with the suction mandrels can be successively positioned in front of the tilted lower tool of the molding station, the tilted or swung lower punching tool and subsequently for transfer into the stacking station in front of the swivel catching device located thereon.

According to a preferred arrangement with a hole punch offset from the line, the article handling unit includes four plates that are arranged at right angles relative to each other and linearly adjustable independently of each other of which, in the predetermined sequence of rotation of the support frame, two plates opposite to each other in the travel direction of the film are always turned towards the molding station on the one hand and the stacking station on the other hand, while one of the two other plates is turned towards the hole punch and the remaining plate occupies a waiting position. Thus, an operation that is certainly determined by the cycle number of the manufacturing process, but is uninterrupted for the feed of the series of articles into the individual stations, is possible. While, specifically, the one plate with its suction mandrels stands in front of the molding station, the articles removed by the suction mandrels of the plate previously positioned in front of the hole punch can be ejected into the tilted lower punching tool, and the suction mandrels of the plate rotated in front of the stacking station can lead the articles previously extracted from the hole punch over to the stacking station. Upon the following cycle, with the rotation of the article handling unit, the plate then passes from the waiting position with its suction mandrels in front of the molding station. This interplay, with the plates shifting according to the rotation, is repeated with each cycle.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
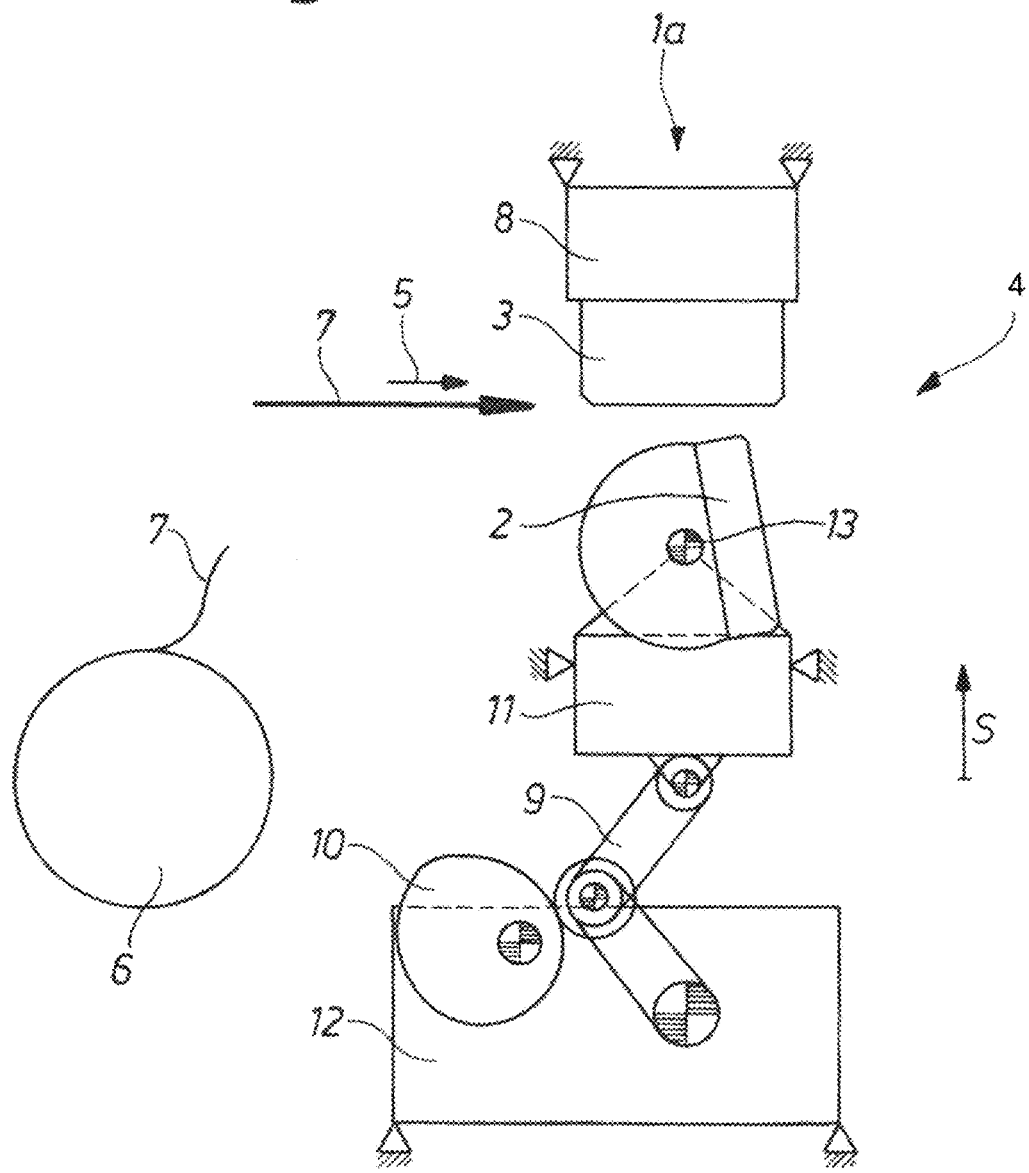
FIG. 1 shows the molding station of a thermoforming machine with a tool that is still open and consists of two halves—an upper and lower tool.

Referring to FIG. 1 a molding station 1a of a thermoforming machine (see FIGS. 2 and 3) is shown in detail. The molding station 1a includes a two-part, molding and punching-out molding tool 4, consisting of a lower tool 2 and an upper tool 3. For the manufacturing of deep-drawn, arbitrary items (such as bowls, cups or pots), a previously heated synthetic film 7 (which is, for example, unwound from a roll 6) intermittently enters in the travel direction 5 of the film.

The upper tool 3 is fixed to a stationary upper yoke 8, while the lower tool 2 is designed as a movable tool half, which moves relative to the upper tool 3. A combined translational and pivoting movement is used in order to, after the shaping and punching out of the articles, be able to more easily remove them and lead them away. The movement of the lower tool 2 is accomplished by a toggle lever 9, at which a cam disk 10 is set. Through this movement mechanism, a lower table or tool table 11, on which the lower tool 2 is mounted, is moved relative to a lower yoke 12. During the movement of the cam disk 10, the molding tool 4 with its lower and upper tool 2, 3 is accordingly opened or closed. The closing direction of the tool is indicated by an arrow S.

The swinging out of the lower tool 2 with its molds arranged in one or more rows corresponding to the number of products to be manufactured into a tilted extraction position as shown in FIG. 1 takes place via a horizontal axis of rotation 13.

A thermoforming machine for manufacturing articles which include holes has a hole punch 1b following the molding station 1a. Arranged subsequently to the hole punch 1b is a stacking station 1c, which may be formed as a well-known stacking and counting device that is otherwise directly downstream of the molding station (see FIGS. 2 and 3).

Figure 2:
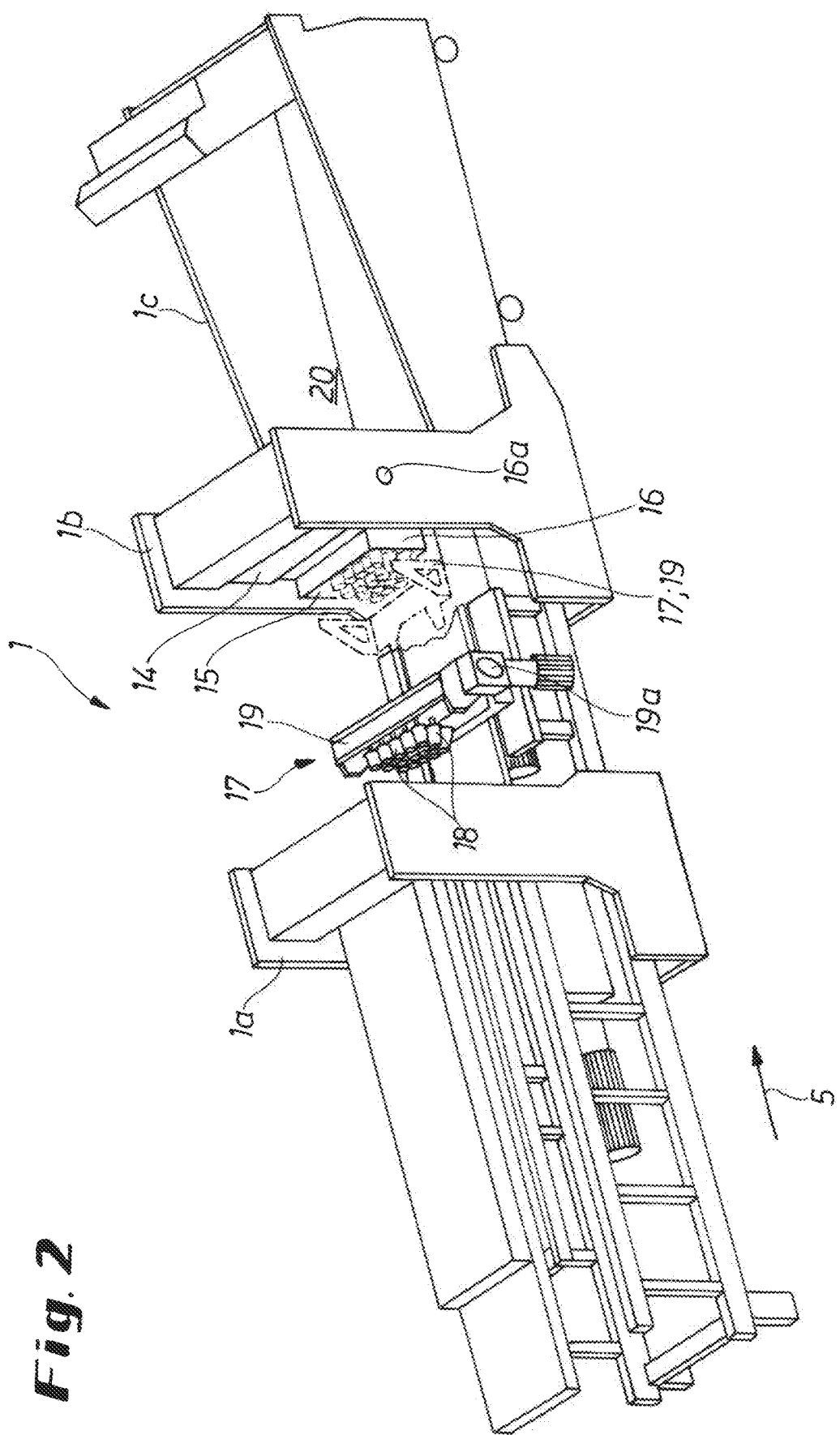
FIG. 2 shows a first version of a thermoforming machine, with a molding station, a hole punch and a stacking station arranged in a line.

As shown in FIG. 2, the hole punch 1b is formed with a movable upper punching tool 14 that can be raised and lowered and lower punching tool 15. The upper punching tool 14 has a number of punching dies or cutting punches that corresponds to the number of articles. The lower punching tool 15 includes article receptacle in a single-row or multi-row arrangement corresponding to the configuration of molds of the lower tool 2 of the molding station 1a. The lower punching tool 15 is arranged on a pivot table 16 that is pivotable around a horizontal axis 16a. The pivot table 16 with the lower punching tool 15 forms the counter tool for the upper punching tool 14, which raises and lowers with the punching dies.

With the design of the thermoforming machine 1 according to FIG. 2, the molding station 1a, the hole punch 1b and the stacking station 1a are arranged in a line. A linearly movable swivel catching device 17 is arranged between the molding station 1a and the hole punch 1b. The swivel catching device 17 receives the molded and punched-out articles from the molding station 1a while its lower tool 2 is in a tilted position as shown in FIG. 1. The swivel catching device 17 has a turning plate 19 which is fitted with multi-row suction mandrels 18, as predetermined by the number of molds of the lower tool 2. The turning plate 19 is pivotable up to 180° around a horizontal axis 19a.

In the illustrated transfer position, the suction mandrels 18 are facing the lower tool 2 of the molding station 1a. After the transfer of the articles, the turning plate 19 is pivoted by 180°, such that the suction mandrels 18 with the received articles face the lower punching tool 15. The lower punching tool 15 and its receptacles are pivoted by 90° against the travel direction of the film 5 to face the turning plate 19. The swivel catching device 17 is then moved towards the lower punching tool 15, such that the articles can be subsequently ejected into the receptacles of the lower punching tool 15. The lower punching tool 15 with the received articles is then pivoted back, for punching, by 90° into exactly the 0-degree home position, in which the holes can be punched out with a 100-percent accuracy. As soon as the punching out is completed, the upper punching tool 14 is raised and the lower punching tool 15 is pivoted in the travel direction of the film 5 by approximately 80° towards the stacking station 1c. There, the perforated finished articles are taken up by a swivel catching device or a turning plate stacker 20, and are discharged on a conveyor belt 21 (see FIG. 3) for counting and stacking, and possibly removal.

Figure 3:
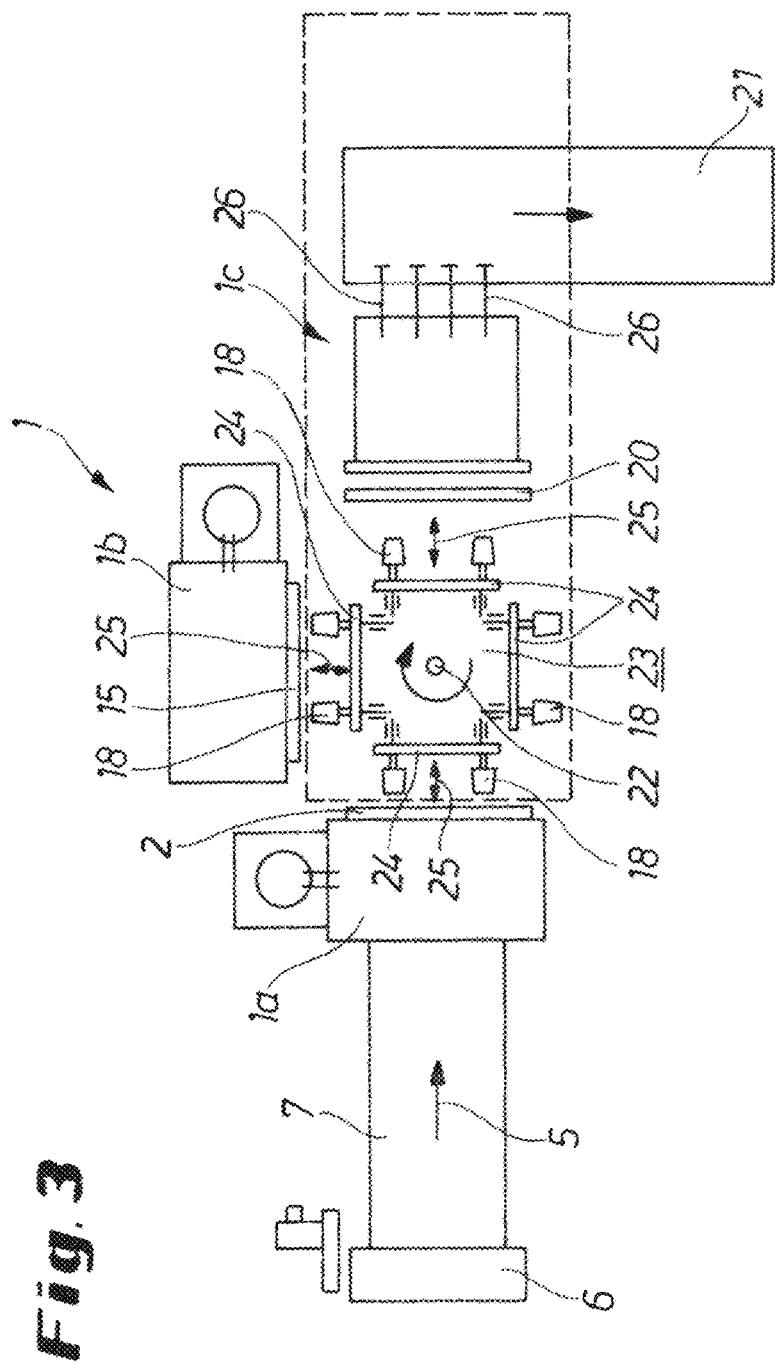
FIG. 3 shows a second version of a thermoforming machine with the hole punch being arranged offset to one side from the line of the molding and stacking station.

The thermoforming machine 1 shown in FIG. 3 differs from the previously described design in that the hole punch 1b is no longer arranged in a line with the other parts of the system. Rather, it is provided in a manner that is offset to one side from the line, and the lower punching tool 15 no longer needs to be pivoted by 180°, but only needs to be pivoted by 90°. Furthermore, the extraction device 17 is no longer pivotable by 180°. Rather, it is formed as an article handling unit with plates 24 which are equipped with suction mandrels 18. The plates 24 are arranged linearly adjustable on a support frame 23. The support frame 23 is rotatable around a vertical axis 22. Four plates 24 are arranged at right angles to each other and are independently linearly adjustable on the support frame 23, as indicated by the double arrows 25.

In operation of the thermoforming machine 1 the film 5 is unwound from the roll 6 and heated by a heating device in the travel direction of the film 5. The film 5 arrives in the molding station 1a, the lower tool 2 of which, after the molding and punching out of the articles, is brought into a tilted position by pivoting in the direction of the removal device 17. The plate 24 turned towards the molding station 1a is moved linearly and picks up the articles with its suction mandrels 18. By turning the support frame 23, this plate arrives in front of the hole punch 1b, which is laterally offset from the line. The lower punching tool 15 is in a position swung out by 90° in the direction of the plate 24 and receives the articles ejected from the suction mandrels 18. For punching the holes, the lower punching tool 15 is pivoted back into the vertical 0° position in the hole punch for punching the holes. Upon completion of the hole punching, the upper punching tool 14 of the hole punch 1b is raised, and the lower punching tool 15 is pivoted back by 90° in the direction of the extraction device 17. Then the now perforated articles are picked up by the suction mandrels 18 of the plate 24 and, through the rotation of the support frame 23, brought in front of the swivel catching device 20 of the stacking station 1c. After received the articles in its suction mandrels the swivel catching device 20 pivots in the travel direction of the film 5 and leads the articles into the stacking station 1c. There the articles are stacked inside of each other into rods and can be expelled onto a conveyor belt 21 by means of push units 26 shown in FIG. 3.

Since the three stations of the thermoforming machine 1 are allocated four plates 24 with suction mandrels 18, with each rotation of the support frame 23, one plate is always in front of the molding station 1a, one in front of the hole punch 1b and one in front of the stacking station 1c. The remaining fourth plate occupies a waiting position. A process flow that is only interrupted by molding and hole punching cycles, but is otherwise continuous, is thereby achieved, and the cycle sequence can be set by the hole punch 1b instead of the molding station 1a.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A thermoforming machine for manufacturing articles from a heated thermoplastic film, comprising:
    a molding station with a molding and punching tool having an upper tool and a lower tool, the lower tool being arranged pivotably around a horizontal axis on a tool table which moves in an opening and a closing direction;
    an extraction device arranged downstream of the molding station in travel direction of the thermoplastic film, the extraction device having suction mandrels which grip punched-out articles from the lower tool while the lower tool is in a tilted position;
    a hole punch with a lower punching tool that is pivotable around a horizontal axis and an upper punching tool which is driven in a raising and lowering manner, the upper punching tool being fitted with punching dies; and
    a stacking station arranged downstream of the hole punch,
    wherein the lower punching tool receives the punched-out articles from the extraction device while being pivoted into a tilted position facing the extraction device and
    wherein the lower punching tool pivots into a vertical 0° position to face the upper punching tool for punching operation.

2. The thermoforming machine according to claim 1, wherein the lower punching tool is arranged on a pivot table.

3. The thermoforming machine according to claim 1,
    wherein the hole punch is arranged in line with the molding station and the stacking station,
    wherein the lower punching tool can pivot both in and against the travel direction of the thermoplastic film,
    wherein a linearly movable swivel catching device is arranged between the molding station and the hole punch, and
    wherein a second swivel catching device is arranged in the stacking station behind the hole punch.

4. The thermoforming machine according to claim 3, wherein the lower punching tool can pivot by a total of 180°.

5. The thermoforming machine according to claim 1,
    wherein the hole punch is arranged offset to one side of a line formed by the molding station and the stacking station,
    wherein the upper punching tool and the lower punching tool extend orthogonal to the molding and punching tool of the molding station,
    wherein the lower punching tool is pivotable towards the line, and
    wherein the extraction device is formed as an article handling unit with linearly adjustable plates that are equipped with suction mandrels, the linearly adjustable plates being arranged on a support frame which is rotatable around a vertical axis.

6. The thermoforming machine according to claim 5, wherein the lower punching tool can pivot by 90°.

7. The thermoforming machine according to claim 5,
    wherein the article handling unit comprises four plates that are arranged at right angles relative to each other and linearly adjustable independently of each other, and
    wherein the support frame is rotated in sequence such that one plate faces the molding station, one plate faces the hole punch, one plate faces the stacking station, and one plate occupies a waiting position, the plate facing the molding station and the plate facing the stacking station being arranged on opposite sides of the support frame.

* * * * *